United States Patent
Achanta et al.

(10) Patent No.: US 7,162,605 B2
(45) Date of Patent: Jan. 9, 2007

(54) METHOD AND SYSTEM FOR OBTAINING MEMORY USAGE INFORMATION FOR A HEAP WHEN A PEAK LIVE COUNT IS UPDATED

(75) Inventors: Phani Gopal Achanta, Austin, TX (US); Robert Tod Dimpsey, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 10/875,931

(22) Filed: Jun. 24, 2004

(65) Prior Publication Data

US 2005/0289315 A1   Dec. 29, 2005

(51) Int. Cl.
*G06F 12/00*   (2006.01)
(52) U.S. Cl. ............... 711/170; 707/205; 707/206; 707/171
(58) Field of Classification Search ............... None
See application file for complete search history.

(56) References Cited

U.S. PATENT DOCUMENTS

| | | | |
|---|---|---|---|
| 6,167,535 A | 12/2000 | Foote et al. ............... 714/38 |
| 6,370,684 B1 | 4/2002 | De Pauw et al. ............ 717/4 |
| 2003/0028741 A1 | 2/2003 | Sokolov et al. ............ 711/171 |
| 2003/0212719 A1* | 11/2003 | Yasuda et al. ............ 707/206 |
| 2004/0015850 A1 | 1/2004 | Sokolov et al. ............ 717/116 |
| 2005/0102657 A1* | 5/2005 | Lewis ............ 717/140 |
| 2005/0289307 A1 | 12/2005 | Achanta et al. |

OTHER PUBLICATIONS

Dimpsey et al., "Java server performance: A case study of building efficient, scalable Jvms", IBM Systems Journal, vol. 39, No. 1, 2000, pp. 151-174.
Alexander et al., "A unifying approach to performance analysis in the Java environment", IBM Systems Journal, vol. 39, No. 1, 2000, pp. 118-134.

* cited by examiner

*Primary Examiner*—Reginald Bragdon
*Assistant Examiner*—Ngoc Dinh
(74) *Attorney, Agent, or Firm*—Duke W. Yee; Herman Rodriguez; Stephen J. Walder, Jr.

(57) ABSTRACT

A method and system for determining the memory utilization of a heap are provided. With the method and system, object allocations and optionally, possible memory freeing events are used to initiate a mark-and-count operation. The mark-and-count operation marks the live objects and maintains a running count of their memory bytes allocated to the live objects, referred to as a live count. The execution of the mark-and-count operation may be dependent upon various criteria including thresholds, functions of the live count, peak live counts, number of memory bytes allocated since a previous mark-and-count operation was performed, and the like. In addition to the live count, a peak live count may be obtained and updated as new peak live counts are identified. When the peak live count is updated, additional information may be obtained via a heap dump, arcflow tree, or the like.

26 Claims, 9 Drawing Sheets

METHOD AND SYSTEM FOR OBTAINING MEMORY USAGE INFORMATION FOR A HEAP WHEN A PEAK LIVE COUNT IS UPDATED

RELATED APPLICATION

The present application is related to co-pending and commonly assigned U.S. patent application Ser. No. 10/875,929 entitled "Method and System for Determining Memory Usage of a Heap," filed on even date herewith, and hereby incorporated by reference.

BACKGROUND OF THE INVENTION

1. Technical Field

The present invention is generally directed to an improved data processing system. More specifically, the present invention is directed to a method and system for obtaining memory usage information for a heap when a peak live count is updated.

2. Description of Related Art

The memory utilization of a JAVA™ heap is an important characteristic of program performance. Whenever a class instance or array is created in a running JAVA application, the memory of the new object is allocated from a single heap. Because a JAVA application runs inside its "own" exclusive Java Virtual Machine (JVM) instance, a separate heap exists for every individual running application. As only one heap exists inside a Java Virtual Machine instance, all threads share it.

A "new" construct in Java is supported in the JVM by allocating memory on the heap for a new object but Java includes no instruction for freeing that memory. The virtual machine itself is responsible for deciding whether and when to free memory occupied by objects that are no longer reference by the running application. Usually, a JVM implementation uses a garbage collector to manage the heap and clean up the heap, i.e. identify objects that no longer have active references in the running application to them and free the memory associated with these "dead" objects.

The garbage collector's primary function is to automatically reclaim the memory used by objects that are no longer reference by the running application. It also can move objects as the application runs to reduce heap fragmentation. The memory that makes up the heap need not be contiguous and can be expanded and contracted as the running program progresses.

Since the heap is a limited resource, it is important to know the live set, i.e. the set of objects that are currently referenced by the running application, at any point in time. The difficulty in obtaining this metric is due to the fact that there is no explicit free event, i.e. an explicit event that itself frees memory associated with "dead" objects, as discussed above. Objects are implicitly freed by reference updating (even an allocation can be freeing memory space) or scope changes (e.g., method/block exits), but this information is not readily available to the user of performance tooling. Because of this, it is not known at any given time the amount of real live data in the heap. Information about the live set only becomes explicitly available at the time of a full garbage collection and this information may not be completely accurate due to enhanced sweeping mechanisms.

There are numerous situations where this information about the live set is invaluable. For example, with Internet based computing systems, administrators may be interested in understanding and planning for the heap requirements given certain inputs. That is, given a business object of a certain size, it is desirable to determine what the heap requirements are for this object as it flows through the JVM. Actually feeding the business object through the system and observing is possible, however due to reasons above, there is no way to observe or measure the information. Thus, it would be desirable to have a method and system for determining the memory utilization of a heap at any time during operation of the computing system.

SUMMARY OF THE INVENTION

The present invention provides a method and system for determining the memory utilization of a heap. With the method and system of the present invention, for each object allocation and possible freeing event, e.g., reference modification, method exit, code block exit, etc., a mark-and-count operation is performed. The mark-and-count operation marks the live objects and maintains a running count of their size. This may be done at a variety of times depending upon the granularity of the information desired. In addition other information may be collected at various times such as a heapdump or call tree.

In one exemplary embodiment, a running count of the number of bytes allocated is maintained along with a running count of the number of bytes associated with live objects. As a result, an indication of the utilization of the heap may be obtained for any particular point in time during operation of the computing system.

In a further embodiment of the present invention, rather than using the mark-and-count operation to collect live object memory usage for the heap with every allocation and possible freeing event, the mark-and-count operation may be performed only when the most current peak live count may be exceeded. With this embodiment, a running count of the total allocation of bytes is maintained (allocation count), a running count of the current allocation of bytes to live objects is maintained (live count), and a current peak allocation of bytes to live objects is maintained (peak live count). A mark-and-count operation is performed on each object allocation event and is not performed on events that may possibly free memory. In addition, if the total bytes allocated since the last measure of the peak live count is less than the peak live count, then the mark-and-count operation need not be performed even though an allocation event occurs. This embodiment helps to reduce the amount of CPU overhead associated with generating the live count information for determining utilization of the heap.

In another embodiment of the present invention, in addition to maintaining the allocation count and live count, a count of the allocated bytes since the last mark-and-count operation is maintained. When this count is greater than a predetermined threshold, a new mark-and-count operation is initiated. This helps to provide an approximation of the heap memory utilization without requiring a mark-and-count operation with every object allocation event and with every possible memory freeing event.

In a further embodiment of the present invention, a low overhead mechanism is provided for determining an approximation of a peak live count for the heap memory utilization. Using a tolerance or threshold approach as discussed above with the determination of the peak live count can provide a peak utilization approximation which can be used to identify memory bottleneck analysis.

With this embodiment, a tolerance or threshold value is specified that identifies the most that the final peak live count can differ from the actual peak live count. In addition, an optional lower bound for the start of collection of the peak live count data may be specified. A mark-and-count operation is performed at specific times determined based on a relationship between a number of bytes allocated since a last mark-and-count operation, a number of bytes of memory allocated to live objects at the last mark-and-count operation, an absolute peak live count from a previous mark-and-count operation, and the tolerance or threshold value.

In one exemplary embodiment, a mark-and-count operation is performed when the sum of the number of bytes allocated since a last mark-and-count operation and a number of bytes of memory allocated to live objects at the last mark-and-count operation is greater than the sum of the absolute peak live count and the tolerance or threshold value. This guarantees that a measurement is taken within a threshold number of bytes of the actual peak live data. If the number of live object memory bytes falls well below the previous peak live count, then the overhead for the measurement will become very small.

In yet another embodiment of the present invention, one or more of the above mechanisms for identifying a peak live count is enhanced such that additional information about the heap is obtained when the mark-and-count operation is performed. For example, when a new peak live count is determined to exist and a mark-and-count operation is performed, a heap dump is collected. If a new peak live count is determined to exist, the previously collected heap dump is replaced with a new heap dump collected at the new peak live count point.

In another embodiment, rather than a heap dump, one or more of the above mechanisms for identifying a peak live count is enhanced by incorporating a real time arcflow tool to generate an arcflow tree of the live objects. This arcflow tree may be replaced with a new arcflow tree when a new peak live count is identified.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
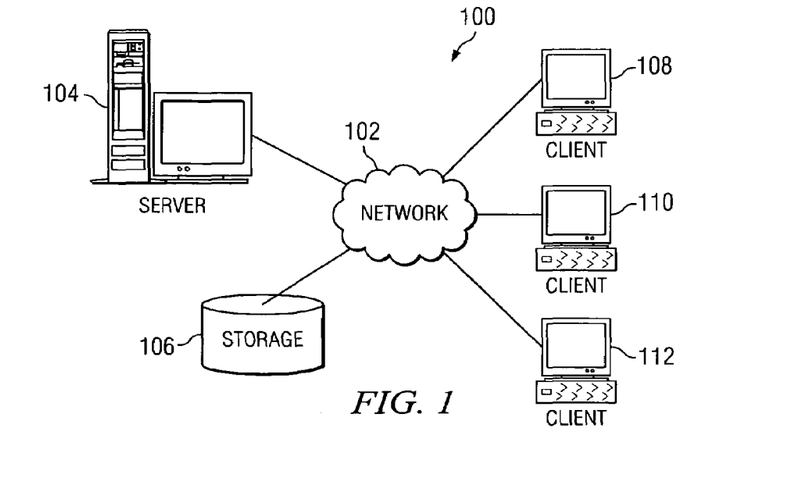
FIG. 1 is an exemplary diagram of a distributed data processing system in which aspects of the present invention may be implemented.
Figure 2:
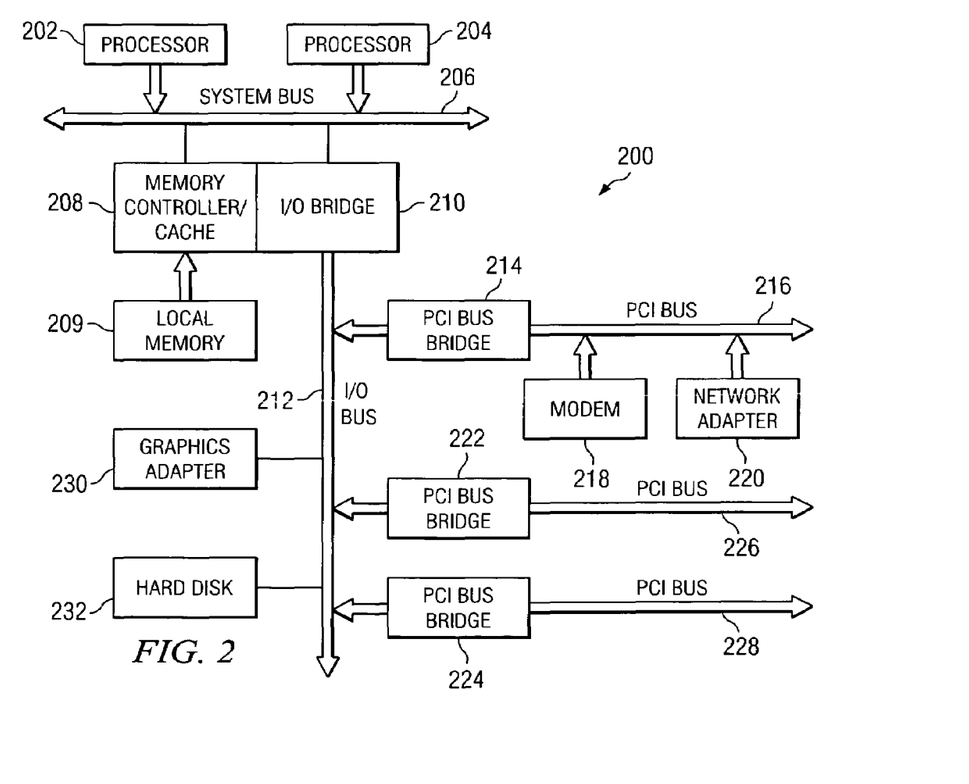
FIG. 2 is an exemplary diagram of a server computing system in which aspects of the present invention may be implemented.
Figure 3:
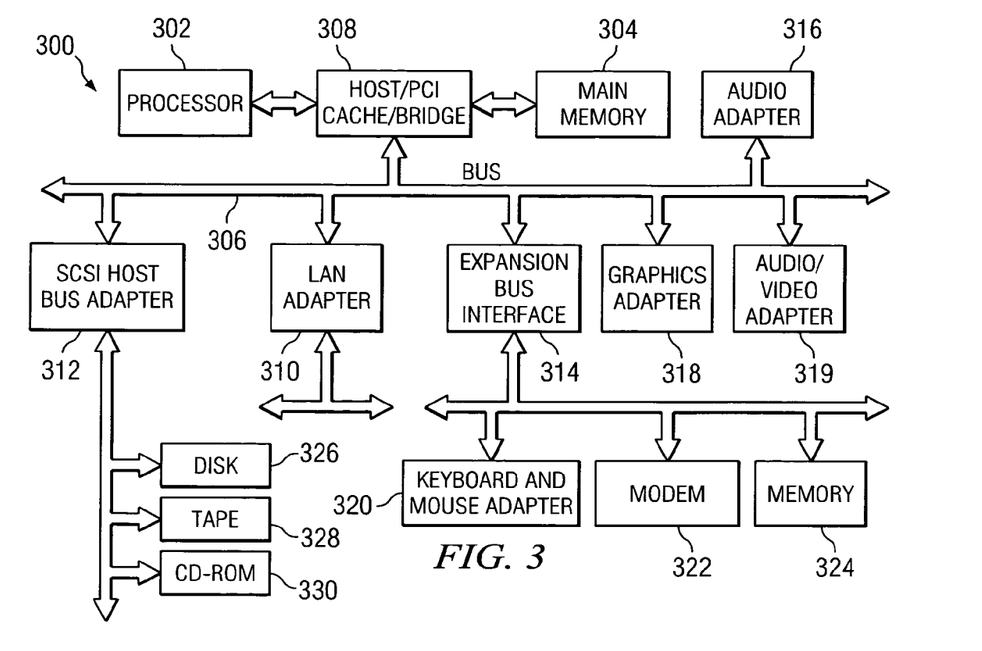
FIG. 3 is an exemplary diagram of a client computing system in which aspects of the present invention may be implemented.

The present invention is directed to a mechanism for determining heap utilization. The present invention is preferably used with computing devices that are part of a distributed data processing environment, such as the Internet, a wide area network (WAN), local area network (LAN), or the like, but is not limited to such and may be used in a stand-alone computing system or completely within a single computing device. The following FIGS. 1–3 are intended to provide a context for the description of the mechanisms and operations performed by the present invention. The systems and computing environments described with reference to FIGS. 1–3 are intended to only be exemplary and are not intended to assert or imply any limitation with regard to the types of computing system and environments in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer or stand-alone computing device in which the aspects of the present invention may be implemented. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Although the present invention may operate on a variety of computer platforms and operating systems, it may also operate within an interpretive environment, such as a REXX, Smalltalk, or Java runtime environment, and the like. For example, the present invention may operate in conjunction with a Java Virtual Machine (JVM) yet within the boundaries of a JVM as defined by Java standard specifications. In order to provide a context for the present invention with regard to an exemplary interpretive environment, portions of the operation of a JVM according to Java specifications are herein described.

Figure 4A:
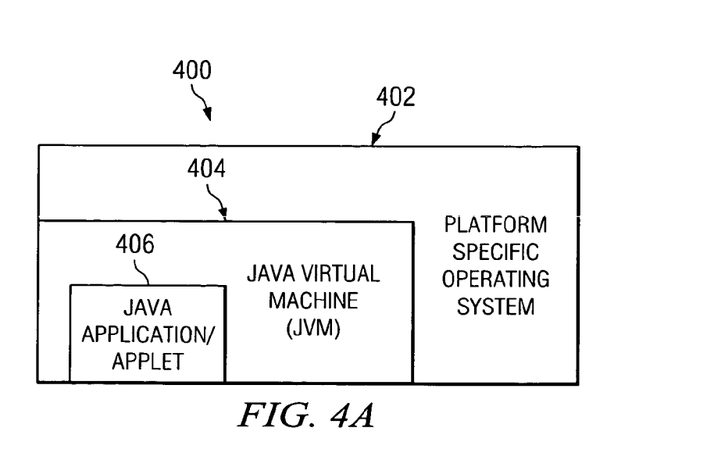
FIG. 4A is an exemplary diagram illustrating the relationship of software components operating within a computer system that may implement aspects of the present invention.

With reference now to FIG. 4A, a block diagram illustrates the relationship of software components operating within a computer system that may implement the present invention. Java-based system 400 contains platform specific operating system 402 that provides hardware and system support to software executing on a specific hardware platform. JVM 404 is one software application that may execute in conjunction with the operating system. Alternatively, JVM 404 may be imbedded inside a Java enabled browser application such as Microsoft Internet Explorer™ or Netscape Communicator™. JVM 404 provides a Java run-time environment with the ability to execute Java application or applet 406, which is a program, servlet, or software component written in the Java programming language. The computer system in which JVM 404 operates may be similar to data processing system 200 or computer 100 described above. However, JVM 404 may be implemented in dedicated hardware on a so-called Java chip, Java-on-silicon, or Java processor with an embedded picoJava core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4B:
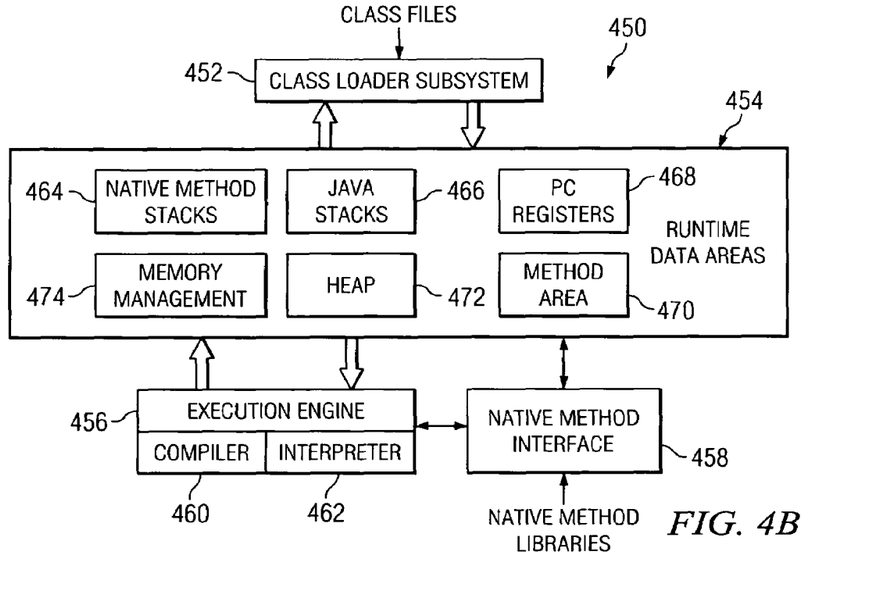
FIG. 4B is an exemplary block diagram of a JVM is depicted in accordance with a preferred embodiment of the present invention.

With reference now to FIG. 4B, a block diagram of a JVM is depicted in accordance with a preferred embodiment of the present invention. JVM 450 includes a class loader subsystem 452, which is a mechanism for loading types, such as classes and interfaces, given fully qualified names. JVM 450 also contains runtime data areas 454, execution engine 456, native method interface 458, and memory management 474. Execution engine 456 is a mechanism for executing instructions contained in the methods of classes loaded by class loader subsystem 452. Execution engine 456 may be, for example, Java interpreter 462 or just-in-time compiler 460. Native method interface 458 allows access to resources in the underlying operating system. Native method interface 458 may be, for example, a Java native interface.

Runtime data areas 454 contain native method stacks 464, Java stacks 466, PC registers 468, method area 470, and heap 472. These different data areas represent the organization of memory needed by JVM 450 to execute a program.

Java stacks 466 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it.

The JVM does not have any registers for holding intermediate values; any Java instruction that requires or produces an intermediate value uses the stack for holding the intermediate values. In this manner, the Java instruction set is well-defined for a variety of platform architectures.

PC registers 468 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 464 store the state of invocations of native methods. The state of native method invocations is stored in an implementation-dependent way in native method stacks, registers, or other implementation-dependent memory areas. In some JVM implementations, native method stacks 464 and Java stacks 466 are combined.

Method area 470 contains class data while heap 472 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 472. JVM 450 includes an instruction that allocates memory space within the memory for heap 472 but includes no instruction for freeing that space within the memory. Memory management 474 in the depicted example manages memory space within the memory allocated to heap 470. Memory management 474 may include a garbage collector which automatically reclaims memory used by objects that are no longer referenced. Additionally, a garbage collector also may move objects to reduce heap fragmentation.

The garbage collector performs operations generally referred to as mark/sweep/compact. These operations are the marking of live objects and coalescing sequences of dead objects and spaces that are not marked as live to thereby free or reclaim memory space. Any fragmentation caused by the live objects within the heap is compacted during the compact operation. Compaction moves objects toward one end of the heap with the goal of creating the largest possible contiguous free area or areas. Compaction helps to avoid allocating new memory to expand the heap size. More information about garbage collection may be found in Dimpsey et al., "Java Server Performance: A Case Study of Building Efficient, Scalable JVMs," IBM System's Journal, January 2000, which is hereby incorporated by reference.

The present invention makes use of the mark operation of garbage collection to identify live objects to which memory space is allocated in the heap. Objects are marked (noted as live) by following chains of references from a set of root objects to all other objects they reach. Marks are recorded in an area of memory allocated outside of the heap, referred to as a mark bit array. A single bit in the mark bit array is set as each new live object is discovered Root objects, the initial set of known live objects, are identified by a set of global references (such as objects referenced by the Java Native Interface) and through inspection of the dynamic state of the program. The entire run-time stack of each thread involved in the Java program is scanned, looking for pointers to objects. Because the location of pointers within the stack is uncertain, a combination of tests is applied to each value on the stack to determine whether it may be a pointer to an object. For instance, if the stack variable in question points outside the range of the heap, it certainly is not a pointer to a Java object. If, after these tests, a value appears to be a pointer to an existing object, that object is marked and included in the root set.

When an object is marked, a reference to it is pushed on a stack called the marking stack. The marking stack is processed by popping an object reference and scanning the associated object for references to other unmarked objects. Newly discovered objects are placed on the stack for future processing. The process completes when all root objects have been examined and the mark stack is empty.

The present invention uses the marking ability of a garbage collector to mark live objects and determine a count of the memory bytes allocated to live objects. During the marking process described above, as the marking stack is processed, the number of memory bytes associated with the objects corresponding to the object references on the marking stack is determined and used to increment a live object count, hereafter referred to as a "live count." The process of marking live objects and counting the number of memory bytes associated with the live objects is referred to as a mark-and-count operation.

The live count in addition to a count of the number of memory bytes allocated to objects in the heap, which is incremented as objects are allocated in the heap during the normal operation of object allocation, may be used to determine the utilization of the heap. These counts may be maintained by hardware or software counters and the values of these counters may be written out to a utilization history file for later use in analyzing the utilization of the heap. The utilization of the heap at any one point in time is determined as the relationship of the number of memory bytes allocated to live objects in the heap and the total number of memory bytes allocated to objects in the heap for that point in time. This relationship identifies how much of the memory allocated to objects in the heap are actually being used by live objects with the remaining allocated bytes being associated with dead objects.

In one exemplary embodiment, the mark-and-count operation described above is performed with each object allocation event and possible memory freeing event, e.g., a reference update event, a method/block exit, or the like. Thus, with every object allocation, the mark-and-count operation is performed such that the count of the number of memory bytes associated with live objects in the heap, i.e. the live count, is updated. In addition, from the object allocation event itself, the number of memory bytes associated with the object is determined and used to increment the count of the total allocation of memory bytes to objects in the heap. The live count is also updated with each reference update, method/block exit, or other event that may result in memory allocated to objects in the heap being freed. At each update of the counts, the values of the counters may be stored in a utilization history file or memory for later use in determining heap utilization.

Figure 5:
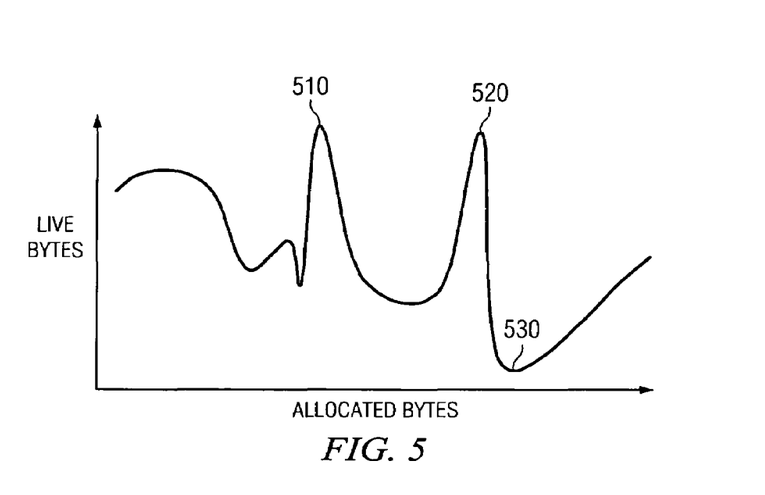
FIG. 5 is an exemplary graph of the heap memory utilization as determined from the live count and total allocation count maintained by the embodiment of the present invention discussed above.

FIG. 5 is an exemplary graph of the heap memory utilization as determined from the live count and total allocation count maintained by the embodiment of the present invention discussed above. As shown in FIG. 5, the graph is a plot of the number of memory bytes associated with live objects in the heap versus the total number of memory bytes allocated to objects in the heap. As shown from the depicted exemplary curve, the relationship between these two counts varies over time as the utilization of the memory by live objects in the heap changes. Thus, at various times, such as at points 510 and 520, the number of bytes of memory space allocated to live objects is a relatively high proportion of the total allocated memory space for objects in the heap. At other times, such as at point 530, the number of memory bytes allocated to objects in the heap is large while the number of memory bytes associated with live objects is relatively low. Thus, from the depicted graph, the memory utilization of the heap at various times during operation of the JVM may be determined. Other graphs using the counts maintained by the present invention may be made without departing from the spirit and scope of the present invention. These graphs may be output to a user workstation for use by the user in determining the memory utilization of the heap for various purposes including capacity planning, debugging, and the like.

Performing the mark-and-count operation with every object allocation and possible memory freeing event provides accurate information about the heap memory utilization at any point during operation of the Java Virtual Machine. However, performing this mark-and-count operation at each of these events causes additional processor overhead. It would be desirable to reduce this overhead in implementations of the present invention where such detailed utilization information is not deemed necessary.

In a further embodiment of the present invention, in order to reduce the additional overhead of the mark-and-count operation discussed above, rather than using the mark-and-count operation to collect live object memory usage for the heap with every allocation and possible freeing event, the mark-and-count operation may be performed only when the most current peak live count may be exceeded. With this embodiment, a running count of the total allocation of bytes is maintained (allocation count), a running count of the current allocation of bytes to live objects is maintained (live count), and a current peak allocation of bytes to live objects is maintained (peak live count). A mark-and-count operation is performed on each object allocation event and is not performed on events that may possibly free memory.

In addition, if the total bytes allocated since the last measure of the peak live count is less than the peak live count, e.g., memory is reclaimed due to garbage collection since the last measure of the peak live count, then the mark-and-count operation need not be performed even though an allocation event occurs. This embodiment helps to reduce the amount of processor overhead associated with generating the live count information for determining utilization of the heap by limiting the mark-and-count operations to only those points in time when the highest, or peak, live count is exceeded. This embodiment provides the necessary information for capacity planning since such planning generally is concerned with the maximum necessary memory allocation size for the heap.

In another embodiment of the present invention, in addition to maintaining the allocation count and live count, a count of the allocated bytes since the last mark-and-count operation is maintained. When this count is greater than a predetermined threshold, a new mark-and-count operation is initiated. This helps to provide an approximation of the heap memory utilization without requiring a mark-and-count operation with every object allocation event and with every possible memory freeing event.

Thus, with this embodiment, a threshold is set and a mark-and-count operation is performed with the next object allocation. The count of allocated bytes since the last mark-and-count operation is then initialized. With each subsequent object allocation, the count of allocated bytes since the last mark-and-count operation is incremented by the number of memory bytes allocated to the object. Once the count of allocated bytes is greater than the threshold, a new mark-and-count operation is performed to determine the current number of memory bytes allocated to live objects, i.e. the live count.

Figure 6:
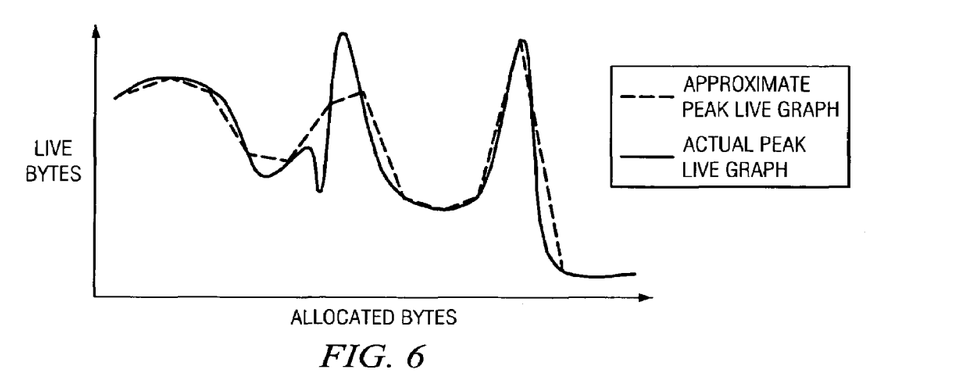
FIG. 6 is a graph of the live count versus the allocated count in which the approximation generated using the present embodiment is shown in relation to the actual graph generated using the embodiment discussed above where the mark-and-count operation is performed for every object allocation and memory freeing event.

Using this embodiment, the number of mark-and-count operations performed is reduced and thus, the processor overhead is reduced. FIG. 6 is a graph of the live count versus the allocated count in which the approximation generated using the present embodiment is shown in relation to the actual graph generated using the embodiment discussed above where the mark-and-count operation is performed for every object allocation and memory freeing event. As shown in FIG. 6, the curve generated by the approximation of the present embodiment provides a good approximation of the heap memory utilization within a threshold of the actual curve.

In a further embodiment of the present invention, a low overhead mechanism is provided for determining an approximation of a peak live count for the heap memory utilization. Using a tolerance or threshold approach as discussed above with the determination of the peak live count can provide a peak utilization approximation which can be used to identify memory bottleneck analysis.

With this embodiment, a tolerance or threshold value is specified that identifies the most that the final peak live count can differ from the actual peak live count. In addition, an optional lower bound for the start of collection of the peak live count data may be specified. A mark-and-count operation is performed at specific times determined based on a relationship between a number of bytes allocated since a last mark-and-count operation, a number of bytes of memory allocated to live objects at the last mark-and-count operation, an absolute peak live count from a previous mark-and-count operation, and the tolerance or threshold value.

In one exemplary embodiment, the a mark-and-count operation is performed when the sum of the number of bytes allocated since a last mark-and-count operation (X) and a number of bytes of memory allocated to live objects at the last mark-and-count operation (Y) is greater than the sum of the absolute peak live count (Z) and the tolerance or threshold value (T):

$$X+Y>Z+T$$

Performing mark-and-count operations based on the above relationship guarantees that a measurement is taken within a threshold number of bytes of the actual peak live count. If the live bytes falls well below the previous peak live count, then the overhead for the measurement will become very small.

Figure 7:
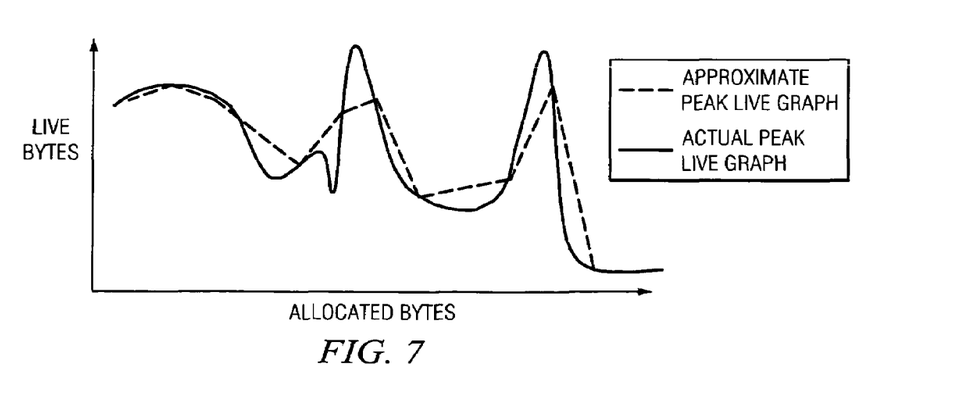
FIG. 7 is an exemplary graph illustrating an approximation obtained using this embodiment of the present invention in relation to an actual curve obtained using an embodiment in which the mark-and-count operation is performed at every object allocation and possible memory freeing event.

FIG. 7 is an exemplary graph illustrating an approximation obtained using this embodiment of the present invention in relation to an actual curve obtained using an embodiment in which the mark-and-count operation is performed at every object allocation and possible memory freeing event. As shown in FIG. 7, the approximate curve provides a good approximation of the actual curve such that a measurement, i.e. a mark-and-count operation, is performed whenever total allocation of memory bytes is within a threshold of the currently determined peak live count.

In yet another embodiment of the present invention, one or more of the above mechanisms for identifying a peak live count is enhanced such that additional information about the objects allocated in the heap is obtained when the mark-and-count operation is performed. For example, when a new peak live count is determined to exist and a mark-and-count operation is performed, a heap dump is collected. If a new peak live count is determined to exist, the previously collected heap dump is replaced with a new heap dump collected at the new peak live count point. A heap dump provides information about all objects left live on the heap and provides the information necessary to know why specific objects are still referenced. Taking periodic heap dumps helps to identify memory leaks by seeing what objects are new and which ones are still around.

In another embodiment, rather than a heap dump, one or more of the above mechanisms for identifying a peak live count is enhanced by incorporating a real time arcflow tool to generate an arcflow tree of the live objects. An arcflow tree is a representation of the method calls performed by live objects in the heap and includes such information as the number of calls made to each method, the dependency structure of the calls, the base and cumulative percentage of resources consumed, and the like. Arcflow is a known tool and is described, for example, in Alexander et al., "A Unifying Approach to Performance Analysis in the Java Environment," IBM Systems Journal, volume 39, no. 1, 2000, which is hereby incorporated by reference. This arcflow tree may be replaced with a new arcflow tree when a new peak live count is identified.

Figure 8:
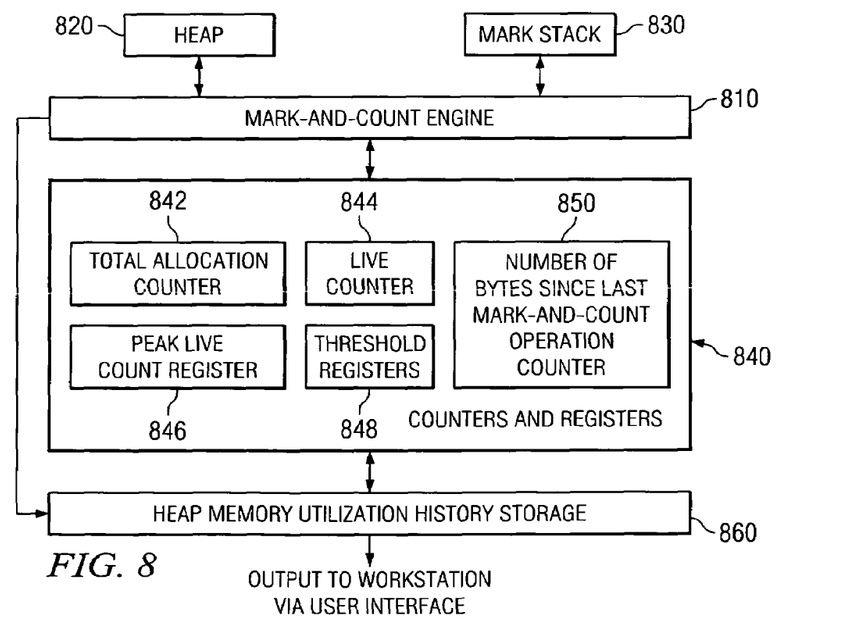
FIG. 8 is an exemplary diagram illustrating the interaction between the primary operational components of an exemplary embodiment of the present invention.

FIG. 8 is an exemplary diagram illustrating the interaction between the primary operational components of an exemplary embodiment of the present invention. The operational components illustrated in FIG. 8 may be provided as part of a virtual machine, such as a Java Virtual Machine, or may be provided as other software components in a data processing device, such as those shown in FIGS. 2 and/or 3.

As shown in FIG. 8, the primary operational components are the mark-and-count engine 810, the heap 820, the mark stack 830, the counters and threshold storage 840 and the heap memory utilization history storage 860. The mark-and-count engine 810 identifies events occurring with respect to the heap 820 that may require a mark-and-count operation to be performed. These events may be, for example, an object allocation in the heap 820, a method/block exit in an object in the heap 820, a object reference update in the heap 820, and the like. Upon the occurrence of such an event, the mark-and-count engine 810 performs a marking operation in which live objects in the heap 820 are identified using the mark stack 830, as discussed above.

Information obtained from the marking operation, as well as information that may be obtained from the processing of the detected events (e.g., total memory bytes allocated to objects in the heap 820), are used to update the counters and threshold storage 840. For example, the total allocation counter 842 stores a total number of bytes of memory that have been allocated to objects (live or dead) in the heap 820. This counter 842 may be updated whether or not an actual mark-and-count operation is performed or not and may be reset when a garbage collection operation is performed.

The live counter 844 counts a number of memory bytes allocated to live objects in the heap 820. The live counter 844 is updated with each mark-and-count operation to reflect the current allocation of memory to live objects in the heap 820.

The peak live count storage 846 stores a count of the highest value for the live counter 844 up to the present time. The value in peak live count storage 846 may be updated as a larger peak value is encountered during the operation of the mark-and-count engine 810.

The threshold storage 846 stores various thresholds for determining when to perform the mark-and-count operations. The threshold storage 846 may be accessed by the mark-and-count engine 810 in determining when to perform such operations.

The number of bytes since last mark-and-count operation counter 850 stores the number of bytes of memory that have been allocated to objects in the heap 820 since a last mark-and-count operation. The counter 850 may be reset after each mark-and-count operation.

The uses of these various counters and threshold storage 840 depend upon the particular mark-and-count methodology selected for the particular implementation of the present invention. A plurality of embodiments is described above and any one or more of them may be implemented within the mark-and-count engine 810. Thus, some or all of the counters and threshold storage 840 depicted in FIG. 8 may or may not be used depending upon the implementation. The manner by which these counters and threshold storage 840 are used with regard to each methodology is evident from the above descriptions of the various embodiments and the following flowchart descriptions.

The heap memory utilization history storage 860 provides a storage device into which counter and register values may be stored in order to provide a history of the heap memory utilization during operation of the computing device. In addition, heap dumps and/or arcflow trees corresponding to peak live counts may be stored in this storage 860 or in a separate storage device (not shown). The history information, heap dumps and/or arcflow trees may be output to a user workstation via a user interface such that a user may determine the manner by which the heap uses memory resources. This may be important for capacity planning, debugging, and other applications.

Thus, the present invention provides a method and system for determining heap memory utilization at any point during operation of the computing device. The method and system of the present invention may be implemented in a number of different ways with a core feature being the use of a mark-and-count operation, to identify live objects in the heap and count the number of bytes of memory currently allocated to live objects in the heap, at various times and under various conditions.

FIGS. 9–13 are flowcharts outlining exemplary operations of embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 9:
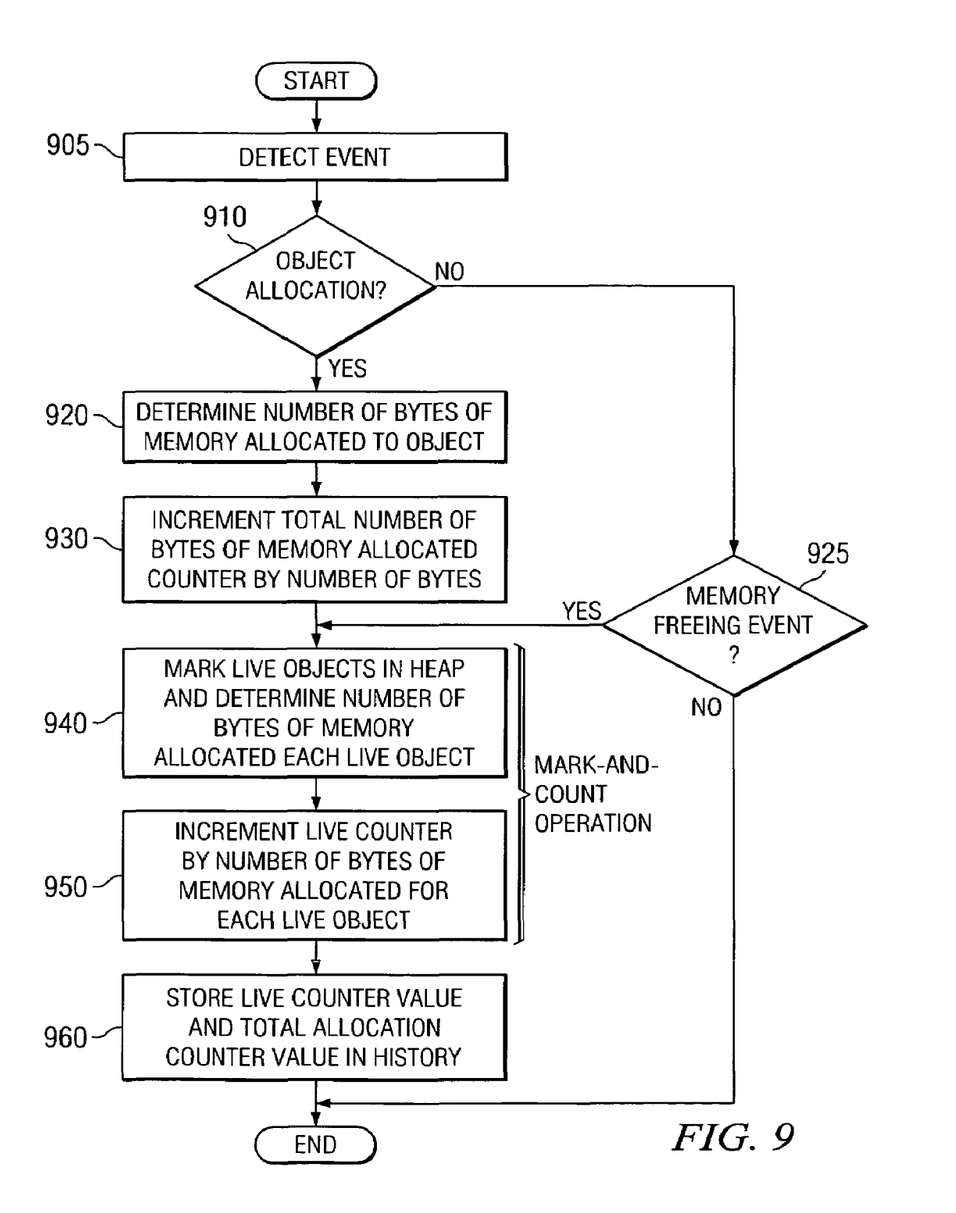
FIG. 9 is flowchart outlining an exemplary operation of one exemplary embodiment of the present invention in which a count of the memory bytes associated with live objects is updated at each object allocation event and possible memory freeing event.

FIG. 9 is flowchart outlining an exemplary operation of one exemplary embodiment of the present invention in which a count of the memory bytes associated with live objects is updated at each object allocation event and possible memory freeing event. As shown in FIG. 9, the operation starts by detecting an event associated with the heap (step 905). A determination is made as to whether the event is an object allocation (step 910). If so, the number of bytes of memory allocated to the object is determined (step 920) and the total number of bytes of memory allocated counter is incremented by this number of bytes (step 930).

If the event is not an object allocation (step 910), then a determination is made as to whether the event is a memory freeing event (step 925). If not, the operation terminates. If the event is a memory freeing event, or after step 930, the operation marks live objects in the heap and determines the number of bytes of memory allocated to each live object (step 940). A live counter is then incremented by the number of bytes of memory allocated for each live object in the heap (step 950). The live counter value and the total allocation counter value are then stored in the history storage for later use and output to a user workstation (step 960). The operation then terminates but may be repeated at the next event occurrence.

Figure 10:
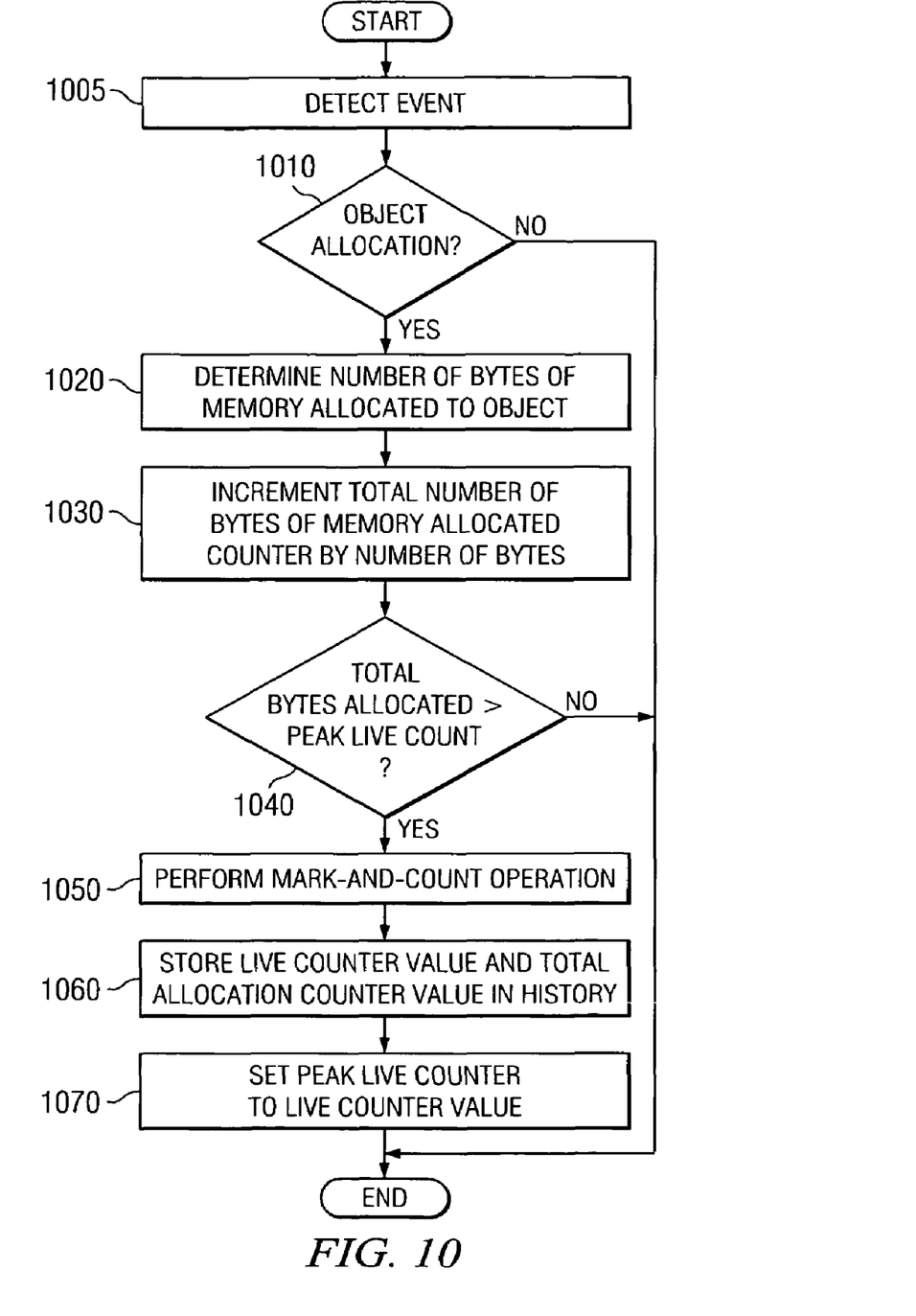
FIG. 10 is a flowchart outlining an exemplary operation of one exemplary embodiment of the present invention in which a mark-and-count operation is performed only when the most current peak live count is exceeded.

FIG. 10 is a flowchart outlining an exemplary operation of one exemplary embodiment of the present invention in which a mark-and-count operation is performed only when the most current peak live count is exceeded. As shown in FIG. 10, the operation starts by detecting an event associated with the heap (step 1005). A determination is made as to whether the event is an object allocation (step 1010). If not, the operation terminates. Otherwise, if the event is an object allocation, the number of bytes of memory allocated to the object is determined (step 1020) and the total number of bytes of memory allocated counter is incremented by this number of bytes (step 1030).

A determination is then made as to whether the total bytes allocated is greater than (or possibly equal to) the peak live count (step 1040). If not, the operation terminates. If the total bytes allocated is greater than the peak live count, then a mark-and-count operation is performed (step 1050), e.g. steps 940 and 950 of FIG. 9. The live counter and total allocation counter values are then stored in the history storage (step 1060). The peak live counter is then set to the live counter value (step 1070) and the operation terminates but may be repeated at the next event occurrence.

Figure 11:
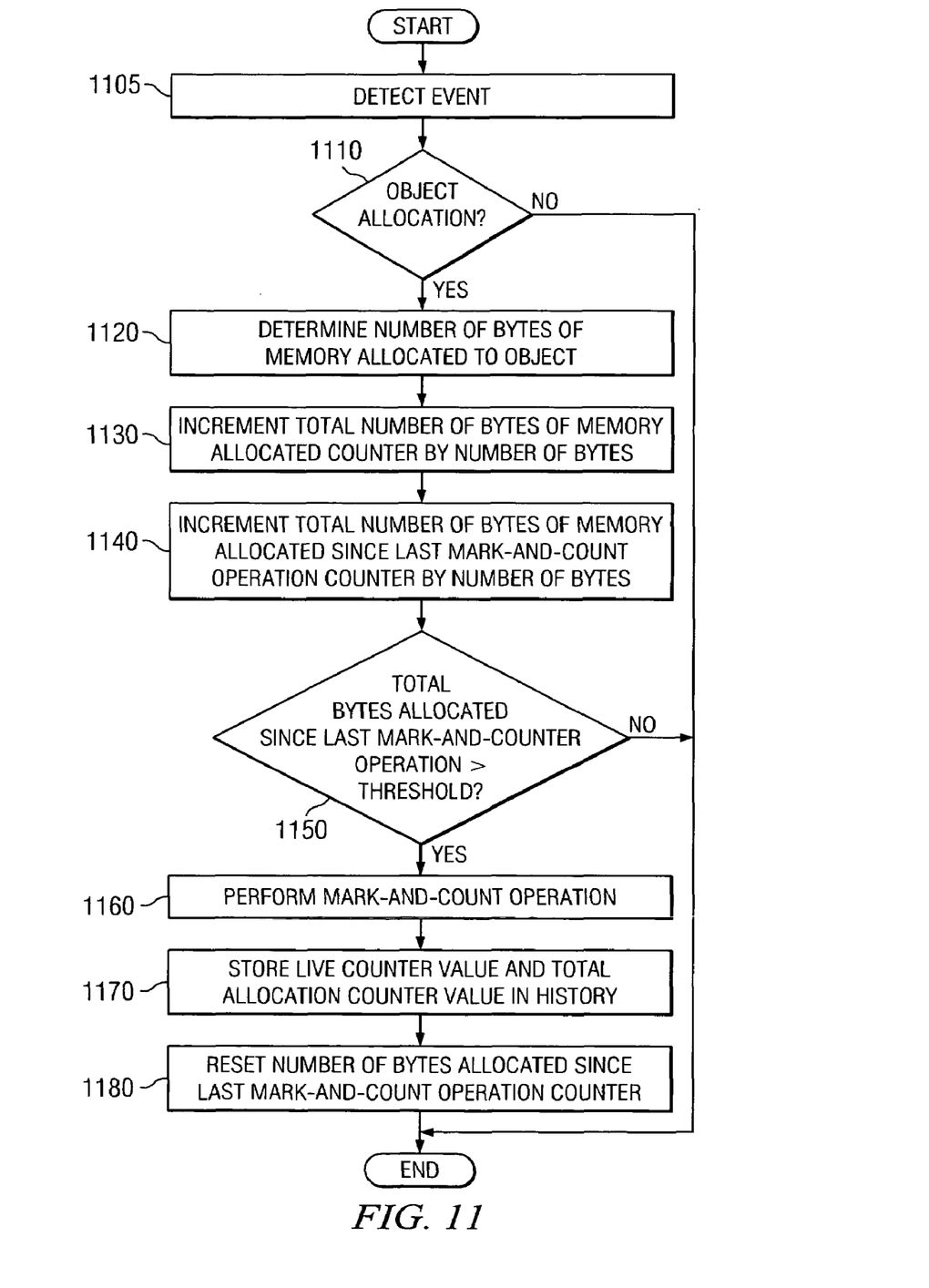
FIG. 11 is a flowchart outlining an exemplary operation of one exemplary embodiment of the present invention in which a mark-and-count operation is performed only when the number of bytes allocated since a previous mark-and-count operation exceeds a threshold.

FIG. 11 is a flowchart outlining an exemplary operation of one exemplary embodiment of the present invention in which a mark-and-count operation is performed only when the number of bytes allocated since a previous mark-and-count operation exceeds a threshold. As shown in FIG. 11, the operation starts by detecting an event associated with the heap (step 1105). A determination is made as to whether the event is an object allocation (step 1110). If not, the operation terminates. Otherwise, if the event is an object allocation, the number of bytes of memory allocated to the object is determined (step 1120) and the total number of bytes of memory allocated counter is incremented by this number of bytes (step 1130).

Thereafter, the total number of bytes of memory allocated since a last mark-and-count operation counter is incremented by the number of bytes allocated to the object (step 1140). A determination is made as to whether the total bytes allocated since the last mark-and-count operation is greater than (or possibly equal to) a threshold amount (step 1150). If not, the operation terminates. If the total bytes allocated since the last mark-and-count operation is greater than (or equal to) a threshold amount, a mark-and-count operation is performed (step 1160). The live counter and total allocation counter values may then be stored in the history storage (step 1170) and the number of bytes allocated since a last mark-and-count operation counter may be reset (step 1180). The operation then terminates but may be repeated at the next event occurrence.

Figure 12:
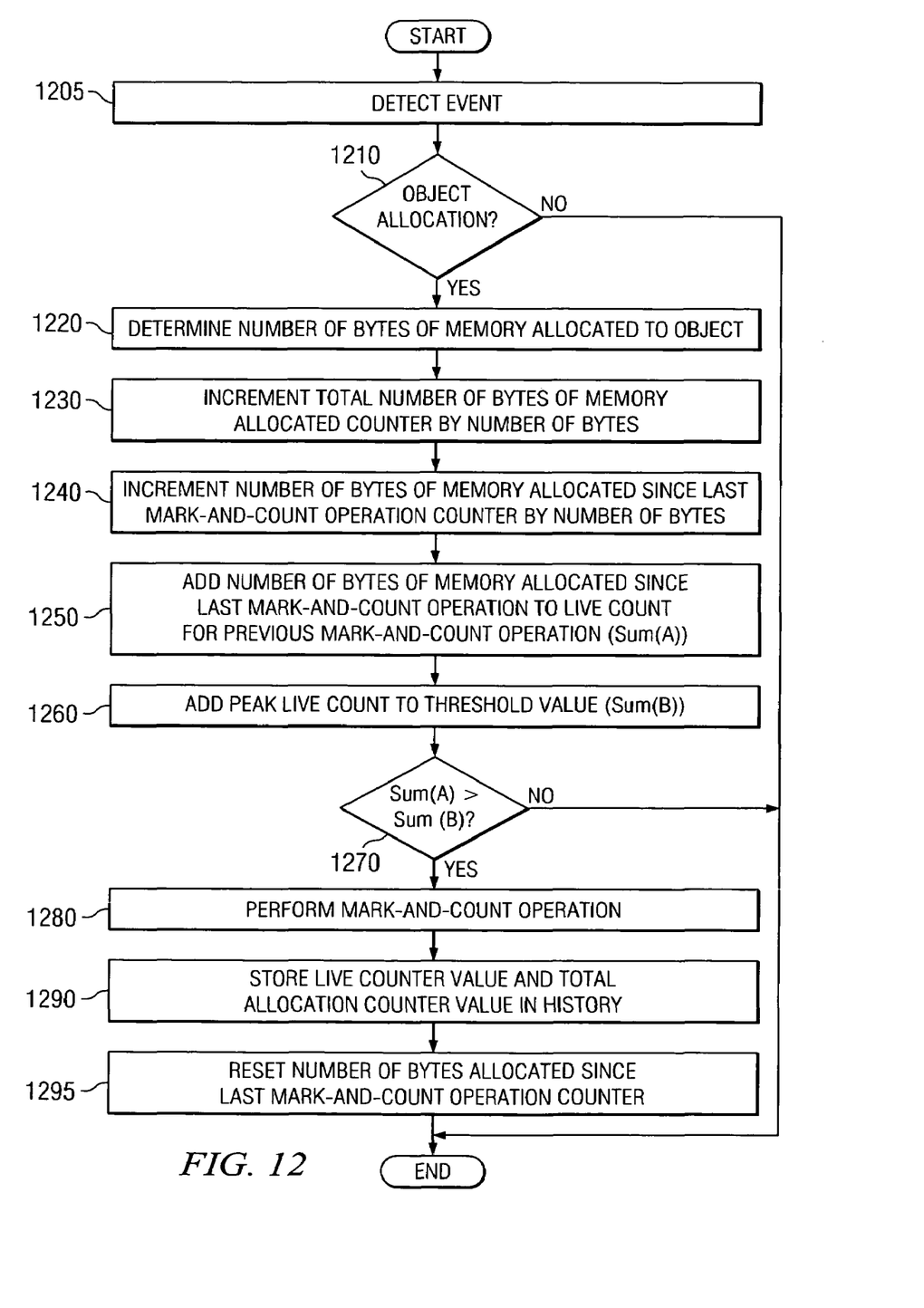
FIG. 12 is a flowchart outlining an exemplary operation of one exemplary embodiment of the present invention in which a peak live object byte count is determined within a tolerance of the actual peak live object byte count.

FIG. 12 is a flowchart outlining an exemplary operation of one exemplary embodiment of the present invention in which a peak live object byte count is determined within a tolerance of the actual peak live object byte count. As shown in FIG. 12, the operation starts by detecting an event associated with the heap (step 1205). A determination is made as to whether the event is an object allocation (step 1210). If not, the operation terminates. Otherwise, if the event is an object allocation, the number of bytes of memory allocated to the object is determined (step 1220) and the total number of bytes of memory allocated counter is incremented by this number of bytes (step 1230).

The number of bytes of memory allocated since a last mark-and-count operation counter is then incremented by the number of bytes allocated to the object (step 1240). Thereafter, the value of the number of bytes of memory allocated since a last mark-and-count operation counter and the value of a live counter for the previous mark-and-count operation are summed to generate a first sum (step 1250). A peak live count is then summed with a threshold value to generate a second sum (step 1260) and a determination is made as to whether the first sum is greater than (or possibly equal to) the second sum (step 1270).

If the first sum is greater than (or equal to) the second sum, then a mark-and-count operation is performed (step 1280). A determination is then made as to whether the peak live count has increased from a previous value (step 1285). If so, the peak live count is updated to be the higher value (step 1287). Thereafter, or if the peak live count has not increased, the live counter and total allocation counter values are then stored to the history (step 1290) and the number of bytes allocated since the last mark-and-count operation counter is reset (step 1295). The operation then terminates and may be repeated when the next event occurs.

Figure 13:
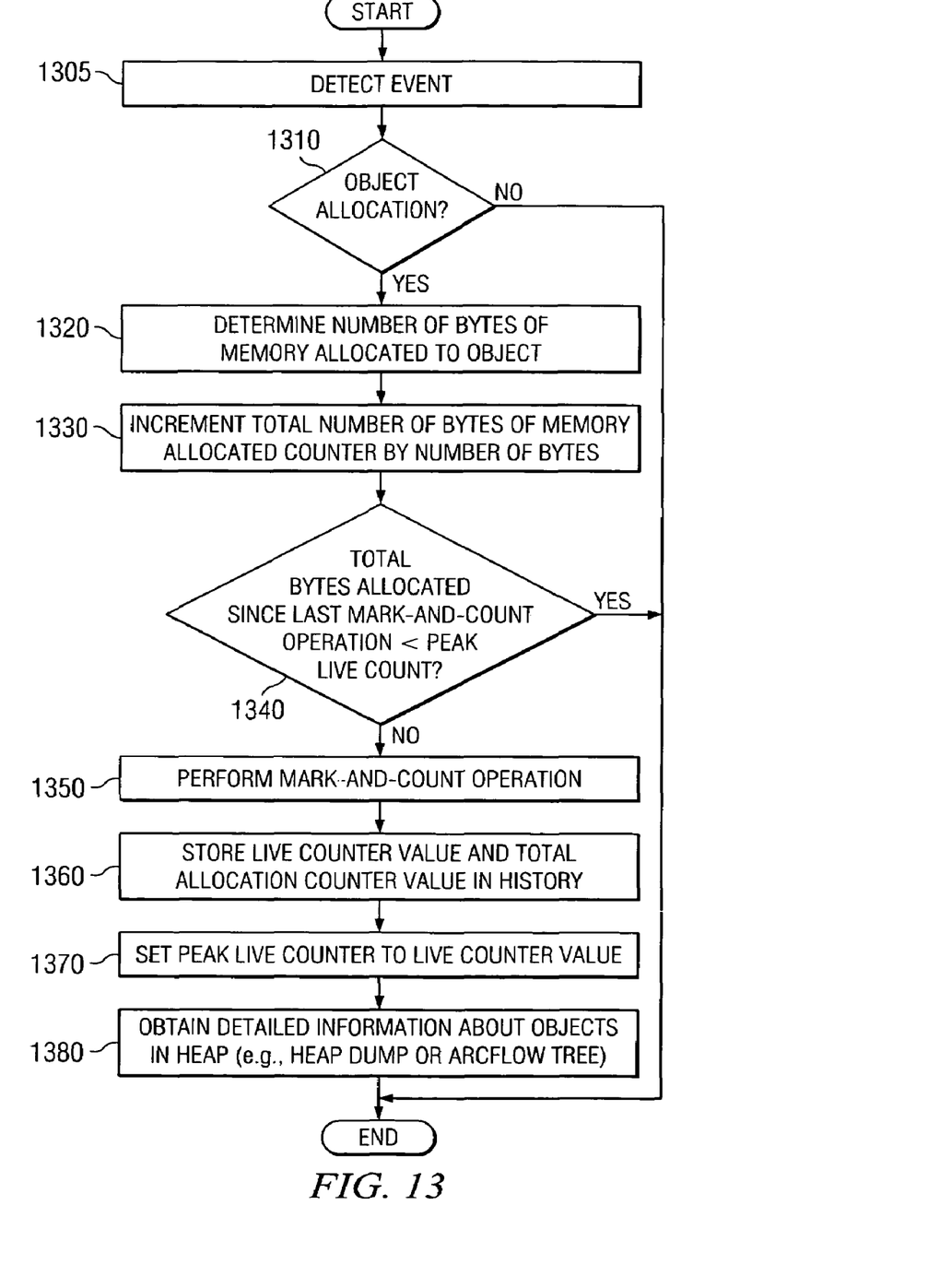
FIG. 13 is a flowchart outlining an exemplary operation of one exemplary embodiment of the present invention in which detailed information about the live objects in the heap is output in response to a determination that a new peak live object byte count is to be generated.

FIG. 13 is a flowchart outlining an exemplary operation of one exemplary embodiment of the present invention in which detailed information about the live objects in the heap is output in response to a determination that a new peak live object byte count is to be generated. The majority of steps in FIG. 13 are similar to that of FIG. 10. An additional step, i.e. step 1380, is provided in which detailed information about the objects in the heap is obtained and stored. This detailed information may take the form of a heap dump, an arcflow tree, or the like. This same step may be added to the flowchart of FIG. 12 in order to obtain additional information about the objects in the heap when Sum(A) is greater than (or equal to) Sum(B).

Thus, the present invention provides mechanisms for determining the heap memory usage at any time during the operation of the computing system. As a result, information about heap utilization may be obtained for use in capacity planning, debugging, and the like. The present invention avoids having to obtain live object information at garbage collection time and thus, avoids the inaccuracies that may be in such information due to the garbage collection operations.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for obtaining information characterizing heap memory utilization, comprising:
    detecting an event associated with objects in the heap;
    marking live objects in the heap in response to detecting the event;
    determining if a number of memory bytes allocated to live objects is greater than a peak live count;
    updating the peak live count to equal the number of memory bytes allocated to live objects if the number of memory bytes allocated to live objects is greater than the peak live count; and
    obtaining information characterizing live objects in the heap in response to updating the peak live count.

2. The method of claim 1, wherein the event is an object allocation in the heap.

3. The method of claim 1, wherein obtaining information characterizing live objects in the heap includes collecting a heap dump.

4. The method of claim 3, wherein the heap dump replaces a previously collected heap dump.

5. The method of claim 1, wherein obtaining information characterizing live objects in the heap includes generating a representation of method calls performed by live objects in the heap.

6. The method of claim 1, wherein obtaining information characterizing live objects in the heap includes generating an arcflow tree of the live objects.

7. The method of claim 1, wherein marking live objects in the heap includes setting a mark bit, associated with a live object in the heap, in a mark bit array.

8. The method of claim 1, wherein marking live objects includes:
    identifying a root set of objects based on at least one of a set of global references and inspection of a dynamic state of a program;
    scanning a runtime stack of each thread of the program to identify pointers to live objects; and
    adding the live objects identified by scanning the runtime stack of each thread of the program to the root set.

9. The method of claim 1, wherein the event is an object allocation event and wherein the marking, determining, updating and obtaining operations are performed only if a total number of bytes allocated since a last determination of the peak live count is equal to or greater than the peak live count.

10. The method of claim 1, further comprising:
    determining an allocation count since a last marking operation; and
    determining if the allocation count since a last marking operation is equal to or greater than a predetermined threshold, wherein the marking, determining, updating and obtaining operations are performed only when the allocation count since a last marking operation is equal to or greater than the predetermined threshold.

11. The method of claim 10, further comprising:
    reinitializing the allocation count since a last-marking operation after performing the marking operation.

12. The method of claim 1, further comprising:
    determining an allocation count since a last marking operation;
    determining an absolute peak live count from a previous marking operation;
    determining a number of memory bytes allocated to live objects at a last marking operation; and
    determining if a function of the allocation count since the last marking operation, the absolute peak live count from a previous marking operation, and the number of memory bytes allocated to live objects at a last marking operation meets a predetermined criteria.

13. The method of claim 12, wherein determining if a function of the allocation count since the last marking operation (X), the absolute peak live count from a previous marking operation (Z), and the number of memory bytes allocated to live objects at a last marking operation (Y) meets a predetermined criteria includes determining if the following relationship is satisfied:

$$X+Y>Z+T$$

where T is a predetermined tolerance value.

14. A computer program product in a computer readable recordable-type medium for obtaining information characterizing heap memory utilization, comprising:
    first instructions for detecting an event associated with objects in the heap;
    second instructions for marking live objects in the heap in response to detecting the event;
    third instructions for determining if a number of memory bytes allocated to live objects is greater than a peak live count;
    fourth instructions for updating the peak live count to equal the number of memory bytes allocated to live objects if the number of memory bytes allocated to live objects is greater than the peak live count; and
    fifth instructions for obtaining information characterizing live objects in the heap in response to updating the peak live count.

15. The computer program product of claim 14, wherein the event is an object allocation in the heap.

16. The computer program product of claim 14, wherein the fifth instructions for obtaining information characterizing live objects in the heap include instructions for collecting a heap dump.

17. The computer program product of claim 16, wherein the heap dump replaces a previously collected heap dump.

18. The computer program product of claim 14, wherein the fifth instructions for obtaining information characterizing live objects in the heap include instructions for generating a representation of method calls performed by live objects in the heap.

19. The computer program product of claim 14, wherein the fifth instructions for obtaining information characterizing live objects in the heap include instructions for generating an arcflow tree of the live objects.

20. The computer program product of claim 14, wherein the second instructions for marking live objects in the heap include instructions for setting a mark bit, associated with a live object in the heap, in a mark bit array.

21. The computer program product of claim 14, wherein the second instructions for marking live objects include:
   instructions for identifying a root set of objects based on at least one of a set of global references and inspection of a dynamic state of a program;
   instructions for scanning a runtime stack of each thread of the program to identify pointers to live objects; and
   instructions for adding the live objects identified by scanning the runtime stack of each thread of the program to the root set.

22. The computer program product of claim 14, wherein the event is an object allocation event and wherein the second, third, fourth and fifth instructions are executed only if a total number of bytes allocated since a last determination of the peak live count is equal to or greater than the peak live count.

23. The computer program product of claim 14, further comprising:
   sixth instructions for determining an allocation count since a last marking operation; and
   seventh instructions for determining if the allocation count since a last marking operation is equal to or greater than a predetermined threshold, wherein the second, third, fourth and fifth instructions are executed only when the allocation count since a last marking operation is equal to or greater than the predetermined threshold.

24. The computer program product of claim 23, further comprising:
   eighth instructions for reinitializing the allocation count since a last-marking operation after performing the marking operation.

25. The computer program product of claim 14, further comprising:
   sixth instructions for determining an allocation count since a last marking operation;
   seventh instructions for determining an absolute peak live count from a previous marking operation;
   eighth instructions for determining a number of memory bytes allocated to live objects at a last marking operation; and
   ninth instructions for determining if a function of the allocation count since the last marking operation, the absolute peak live count from a previous marking operation, and the number of memory bytes allocated to live objects at a last marking operation meets a predetermined criteria.

26. The computer program product of claim 25, wherein the ninth instructions for determining if a function of the allocation count since the last marking operation (X), the absolute peak live count from a previous marking operation (Z), and the number of memory bytes allocated to live objects at a last marking operation (Y) meets a predetermined criteria include instructions for determining if the following relationship is satisfied:

$X+Y>Z+T$ where T is a predetermined tolerance value.

* * * * *